United States Patent
Day et al.

(10) Patent No.: US 6,709,744 B1
(45) Date of Patent: Mar. 23, 2004

(54) BIOACTIVE MATERIALS

(75) Inventors: Delbert E. Day, Rolla, MO (US); Erik M. Erbe, Berwyn, PA (US); Marina Richard, Horseheads, NY (US); Joshua A. Wojcik, Alexandria, VA (US)

(73) Assignees: The Curators of the University of Missouri, Columbia, MO (US); Vita Licensing, Inc, Wilmington, DE (US)

( * ) Notice: Subject to any disclaimer, the term of this patent is extended or adjusted under 35 U.S.C. 154(b) by 164 days.

(21) Appl. No.: 09/928,736

(22) Filed: Aug. 13, 2001

(51) Int. Cl.$^7$ .............................................. B32B 15/02

(52) U.S. Cl. ...................... 428/403; 428/404; 428/406; 428/407; 424/1.29; 424/489; 424/601; 424/660; 424/677; 424/696

(58) Field of Search .............................. 428/403, 404, 428/406, 407; 424/489, 1.29, 601, 660, 677, 696

(56) References Cited

U.S. PATENT DOCUMENTS

| | | | |
|---|---|---|---|
| 5,204,106 A | 4/1993 | Schepers et al. | 424/423 |
| 6,244,871 B1 * | 6/2001 | Litkowski et al. | 433/217.1 |
| 6,379,648 B1 * | 4/2002 | Day et al. | 424/1.29 |

OTHER PUBLICATIONS

Wojcik, J., "Hydroxyapatite Formation on a Silicate and Borate Glass," M.S. Thesis, University of Missouri–Rolla, 1999.*

Akao, M. et al., "Mechanical Properties of Sintered Hydroxyapatite for Prosthetic Applications", *J. Mater. Sci.*, 1981, 16, 809–812.

Andersson, Ö. H. et al., "Calcium phosphate formation at the surface of bioactive glass in vitro," *J. Biomed. Mat. Res.*, 1991, 25, 1019–1030.

Bigi, A. et al., "Hydroxyapaptite–Gelatin Films: a Structural and Mechanical Characterization," *Biomaterials*, 1998, 19, 739–744.

Brown, W. et al., "Chemical Properties of Bone Mineral," in *Annual Review of Materials Science*, Huggins. R. et al. (eds.), Annual Reviews Inc., 1976, 213–236.

Deptula, A. et al., "Preparation of spherical powders of hydroxyapatite by sol–gel process," *J. Non. Cryst. Sol.*, 1992, 147 & 148, 537–541.

Doremus, R. et al., "Review Bioceramics," *J. Mater. Sci.*, 1992, 27, 285–297.

Filho, O. et al., "Effect of Crystallization on Apatite Layer Formation of Bioactive Glass 45S5," *J. Biomed. Mater. Res.*, 1996, 30, 509–514.

Gatti, A. et al., "Bioactive Glasses and Chemical Bond", *Biomaterials: Hard Tissue Repair and Replacement*, Munster D. (Ed.), Elsevier, 1992, 97–106.

Hata, K. et al., "Growth of a Bonelike Apatite Layer on a Substrate by a Biomimetic Process," *J. Amer. Cer. Soc.*, 1995, 78(4), 1049–1053.

Hayakawa, S. et al., "Mechanism of Apatite Formation on a Sodium Silicate Glass in a Simulated Body Fluid", *J. Am. Ceram. Soc.*, 1999, 82, 2155–2160.

Hench, L. et al., "Introduction," *An Introduction to Bioceramics*, L. Hench and J. Wilson (eds.), Advanced Series in Ceramics, 1, 1993, 1–24.

Hench, L., "Bioceramics: From Concept to Clinic", *J. Am. Ceram. Soc.*, 1991, 74(7), 1487–1510.

Hench, L. et al., "Bonding Mechanisms at the Interface of Ceramic Prosthetic Materials", *J. Biomed Mater. Res. Symp.*, 1971, 2(Part 1), 117–141.

(List continued on next page.)

*Primary Examiner*—Leszek Kiliman
(74) *Attorney, Agent, or Firm*—Woodcock Washburn LLP

(57) ABSTRACT

Bioactive substantially silica-free glass material with a hydroxyapatite layer thereon is described, as well as methods for producing hydroxyapatite on a borate glass.

40 Claims, 13 Drawing Sheets

OTHER PUBLICATIONS

Koeneman, J. et al., "Workshop on Characterization of Calcium Phosphate Materials", *J. Appl. Biomat.*, 1990, 1, 79–90.

Kokubo, T., "Surface Chemistry of Bioactive Glass–Ceramics," *J. Non–Cryst. Solids*, 1990, 120, 138–151.

Kokubo, T. et al., "Chemical Reaction of Bioactive Glass and Glass–Ceramics with a Simulated Body Fluid", *J. Mater. Med*, 1992, 3, 79–83.

Kokubo, T. et al., "Solutions able to Reproduce in–vivo Surface–Structure Changes in Bioactive Glass–Ceramic A–W", *J. Biomed. Mater. Res.*, 1990, 24, 721–734.

Kotani, S. et al., "The Bone–Bonding Behavior of Two Glass–Ceramics (KGS and A–W GC)," *Bioceramics*, 1989, 2, 105–112.

Lacefield, W.R., "Hydroxyapatite Coatings", Ducheyne, P. et al., (eds.), *Bioceramics: Material Characteristics Versus in–vivo Behavior*, Academie of Science, NY, 1988, pp. 72–80.

Lavernia, C. et al., "Calcium Phosphate Ceramics as Bone Substitutes", *Ceram. Bull.*, 1991, 70(1), 95–100.

Li, P. et al., "Apatite Formation Induced by Silica Gel in a Simulated Body Fluid", *J. Am. Ceram. Soc.*, 1992, 75, 2094–2097.

Neo, M. et al., "Differences in Ceramic–Bone Interface Between Surface–Active Ceramics and Resorbable Ceramics; A Study by Scanning and Transmission Electron Microscopy", *J. Biomed. Mater. Res.*, 1992, 26, 255–267.

Neo, M. et al., "A Comparative Study of Ulrastructures of the Interfaces Between Four Kinds of Surface–Active Ceramic and Bone", *J. Biomed. Mater. Res.*, 1992, 26, 1419–1432.

Osaka, A. et al., "Calcium Apatite Prepared from Calcium Hydroxide and Orthphosphoric Acid", *J. Mater. Sci.: Mater. Med.*, 1991, 2, 51–55.

Palavit, G. et al., "Stability of a Bioactive Gel Covering a Glass and Fiber–Reinforced Bioactive Glass Dental Root Implants", Ducheyne, P. et al., (eds.), *Bioceramics: Material Characteristics Versus in–vivo Behavior*, Academie of Science, NY, 1988, pp. 91–99.

Pernot, F. et al., "In–vivo Corrosion of Sodium Silicate Glasses," *J. Biomed. Mater. Res.*, 1985, 19, 293–301.

Schepers, E. et al., "Interfacial Behavior of Bulk Bioactive Glass and Fiber–Reinforced Bioactive Glass Dental Root Implants", Ducheyne, P. et al., (eds.), *Bioceramics: Material Characteristics Versus in–vivo Behavior*, Academie of Science, NY, 1988, pp. 178–189.

Schepers, E. et al., "Bioactive glass particles of narrow size range for the treatment of oral bone defects: a 1–24 month animal experiment with several materials and particle sizes and size ranges", *J. Oral Rehab.*, 1997, 24, 171–181.

Schepers, E., "Bioactive Glass Particulate Material as a Filler for Bone Lesions", *J. Oral Rehab.*, 1991, 18, 439–452.

Wheeler, D.L. et al., "Effect of Bioactive Glass Particle Size on Osseous Regeneration of Cancellous Defects," *J. Biomed. Mater. Res.*, 1998, 41, 527–533.

Wilson, J. et al., "Toxicology and biocompatability of bioglasses," *J. Biomed. Mater. Res.*, 1981, 15, 805–810.

Griffon, D.J. et al., "Early dissolution of a morsellised impacted silicate–free bioactive glass in metaphyseal defects", *J. Biomed Mater Research*, 2001, 58(6), 638–644.

* cited by examiner

| Glass type | Starting pH | Reaction time (days) | Reaction product | Detection Method |
|---|---|---|---|---|

Reaction in 1M $K_2HPO_4$ Solution

| Glass type | Starting pH | Reaction time (days) | Reaction product | Detection Method |
|---|---|---|---|---|
| 45S5B1 | 7 | 5 | HAp | XRD, IR |
| 45S5c | 7 | 35 | HAp | IR |

Reaction in 0.1M $K_2HPO_4$ Solution

| Glass type | Starting pH | Reaction time (days) | Reaction product | Detection Method |
|---|---|---|---|---|
| 45S5B1 | 7 | 14 | HAp | XRD, IR |
| 45S5c | 7 | 28 | HAp | XRD, IR |

Reaction in 0.01M $K_2HPO_4$ Solution

| Glass type | Starting pH | Reaction time (days) | Reaction product | Detection Method |
|---|---|---|---|---|
| 45S5B1 | 7 | 112 | Amorphous Ca-P | XRD, IR |
| 45S5c | 7 | 112 | Amorphous Ca-P | XRD, IR |

Reaction in 0.001M $K_2HPO_4$ Solution

| Glass type | Starting pH | Reaction time (days) | Reaction product | Detection Method |
|---|---|---|---|---|
| 45S5B1 | 7 | 112 | Amorphous Ca-P | XRD, IR |
| 45S5c | 7 | 112 | Amorphous Ca-P | XRD, IR |

FIGURE 3

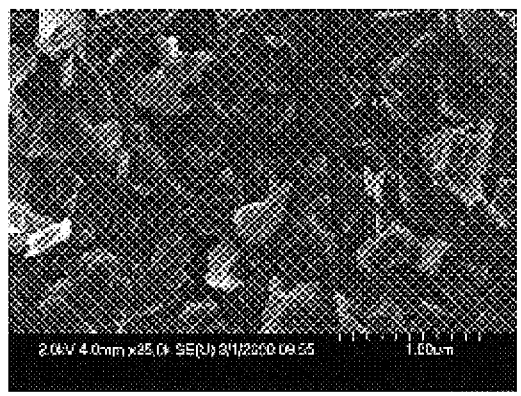
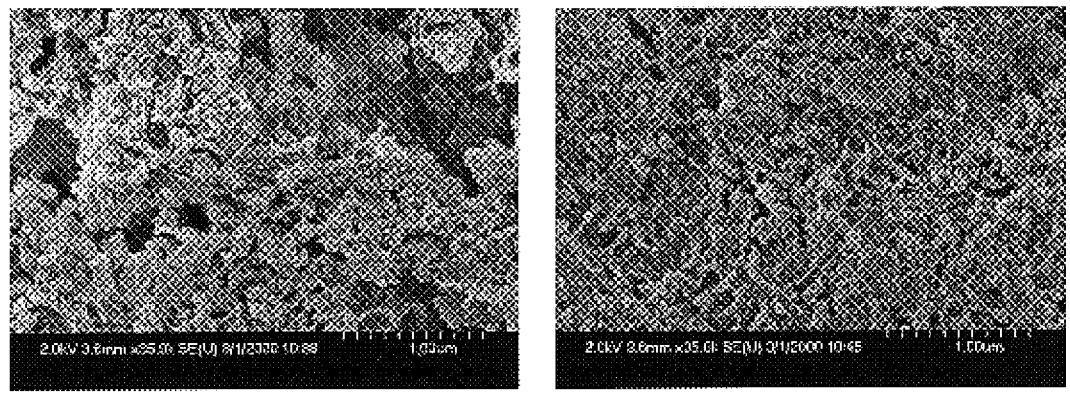
FIGURE 7

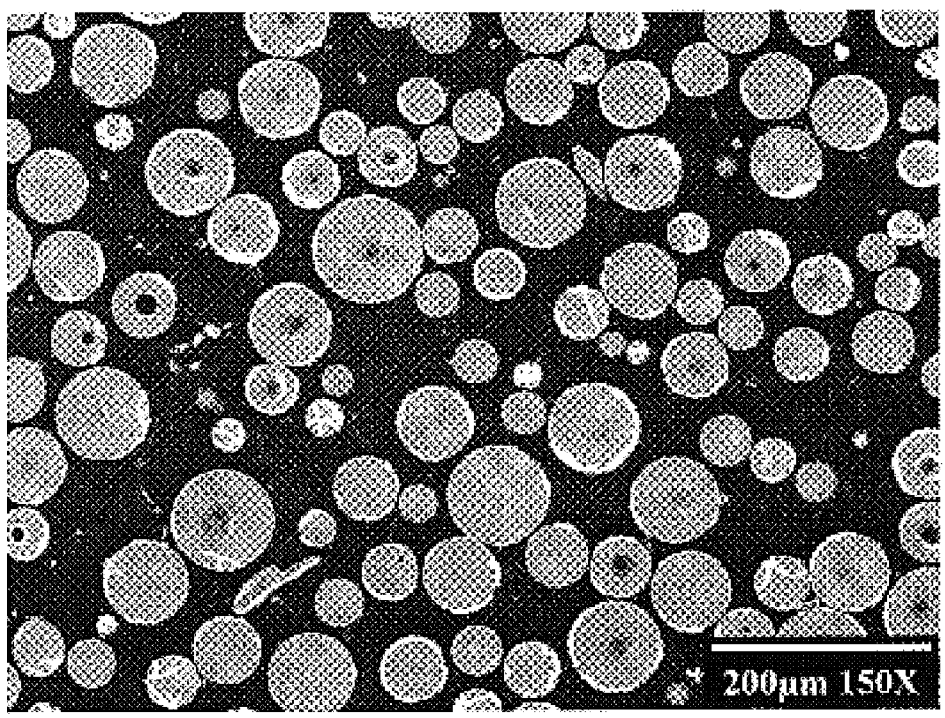
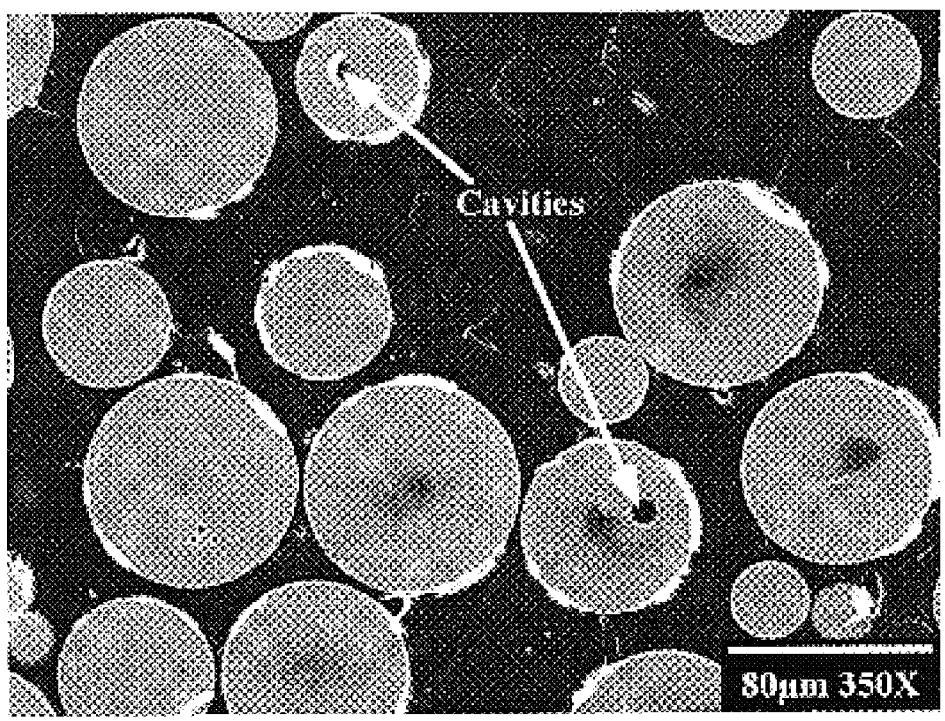
FIGURE 10

BIOACTIVE MATERIALS

FIELD OF THE INVENTION

This invention relates to materials having the capacity to form a calcium phosphate (CaP) layer thereon. These materials are ceramic, glass, glass-ceramic or partially crystalline and are bioactive in that they are osteoconductive, osteostimulatory or osteogenic nature when contacted with physiologic solutions, including mammalian bodily fluids and tissues. This invention also provides rapid methods of producing CaP (Hydroxyapatite (HAp) and amorphous HAp) on the surface of a bioactive material.

BACKGROUND OF THE INVENTION

Certain prior ceramic compositions, especially glass and glass-ceramic, are known to support the bonding, growth or genesis of bone by fostering a supportive environment between the material and living, bone progenitor cells. It is widely recognized that successful bioactive glasses include silica in order to foster the needed supportive environment. These compositions are considered bioactive since they possess surfaces capable of fostering a calcium phosphate layer which, in turn, promotes bone bonding to the material. Bioactive materials of the type described herein include surface-active materials such as those disclosed in U.S. Pat. No. 5,204,106, Schepers, et al., termed 45S5 glass which are of the composition $Na_2O \cdot CaOP_2O_5 \cdot SiO_2$.

When implanted, bone formation has been observed in 45S5 as occurring throughout the entire defect through osteogenesis via osteostimulation, assisted by osteoconduction due to the calcium phosphate layer that is formed prior to the central, cellular mediated disintegration. As used herein, osteoconduction generally means the apposition of growing bone to the three dimensional surface of a suitable scaffold provided by a graft. Osteogenesis, as used herein, generally means the process of bone formation through cellular osteoblastic activity. Osteostimulation, as used herein, generally means the promotion of bone growth. Upon central disintegration, the bioactive glass particles are fully transformed into calcium phosphate. The composition and size of the preferred granules in Schepers et al., are such that the particles are gradually transformed as the defect site becomes vascularized and populated with bone tissue-forming cells.

Kokubo et al., "Chemical Reaction of Bioactive Glass and Glass-Ceramics with a Simulated Body Fluid," *J Mater. Sci.: Mater. Med* 3, 79–83 (1992), among others, have described the need for a hydroxyapatite layer to promote bone bonding since hydroxyapatite, whose stochiometric composition is $Ca_{10}(PO_4)_6(OH)_2$, is the major inorganic component of living bone. It is biocompatible with hard and soft tissues when used as implants. The crystallinity of HAp varies with the maturity of the bone, can contain carbonate, and can be calcium or phosphate deficient.

The drive to form hydroxyapatite on glass materials led Hench and others to use 45S5 glass as a starting material (L. L. Hench, R. J. Splinter, T. K. Greenlee, and W. C. Allen, "Bonding Mechanisms at the Interface of Ceramic Prosthetic Materials," *J Biomed Mater. Res. Symp.* 117–141 (1971)). The theory of apatite formation was extensively explained through the necessary steps of the formation of a hydrated silica gel layer inducing and promoting the nucleation of apatite. When alkali silicate glasses dissolved, alkali ions at the glass surface were selectively exchanged for hydronium ions in the surrounding solution, leaving a hydrated silica gel layer, which served as a nucleation site for CaP crystal deposition, and then subsequent dissolution. Thereafter, most glass compositions used for bioactive purposes contained from 30 to 60 Wt. % $Sio_2$, since it was widely accepted that the formation of hydroxyapatite would occur on particles with a silica-rich layer.

Neo et al., "Difference in Ceramic-Bone Interface Between Surface-Active Ceramics and Resorbable Ceramics; A Study by Scanning and Transmission Electron Microscopy," *J. Biomed. Mater. Res.*, 26, 255–267 (1992), recognize that surface active glasses and glass ceramics bond to bone through an intervening hydroxyapatite layer. When in contact with bodily fluids, the surface of the silicate glass is transformed into a silica-rich layer onto which calcium and phosphorus ions from the surrounding fluids precipitate as a calcium phosphate hydroxyapatite layer. This intervening hydroxyapatite layer is free of collagen and composed of fine granular apatite crystals distinct from those of bone.

The process of synthesizing hydroxyapatite is often time consuming. Processes such as precipitation, hydrolysis, or the use of sol gel usually require several steps over several weeks to form hydroxyapatite, and yet, stochiometric hydroxyapatite cannot be achieved easily. Even 45S5, which provides a surface for the formation of HAp, have in vivo reactions that occur slowly prior to fully bonding to bone. There are few alternative ceramic compositions that are capable of supporting bone growth without silica playing a critical role in the formation process.

Bioactive glasses have been very successful in the promotion of bone growth via a HAp layer, but there are problems. By enlarging the range of starting materials, the drawbacks found in present materials such as those relying chiefly on the presence of silica, may be avoided. Alternative starting materials such as those containing borate may also produce HAp at a faster rate.

Accordingly, it is the object of this invention to provide alternative bioactive materials that are bioactive when used in vivo.

It is also the object of this invention to provide more rapid methods for producing CaP on a bioactive glass.

Additional objects, advantages and novel features of this invention will become apparent to those skilled in the art upon examination of the following descriptions, figures and claims thereof, which are not intended to be limiting.

BRIEF DESCRIPTION OF THE DRAWINGS

FIG. 3 is a table depicting a summary of reactions of 45S5c (partially crystallized 45S5) and 45B5-1 glass spheres in $K_2HPO_4$ solutions.

FIG. 7 depicts the appearance of the surface of 45B5-1 glass spheres (A) and the surface underneath the plate layer (B and C) reacted for 16 weeks (112 days) in a 0.001 M $K_2HPO_4$ solution at 37° C. of starting pH of 7.

FIG. 10 shows 45B5-1 glass microspheres, after immersion in 1 M $Na_2HPO_4$ solution for 24 hours at 37° C., which were subsequently mounted in polymethyl methacrylate (PMMA) and cross-sectioned. The cavities or dark spots inside the microspheres are gas bubbles formed during spheroidization.

SUMMARY OF THE INVENTION

Figure 1:
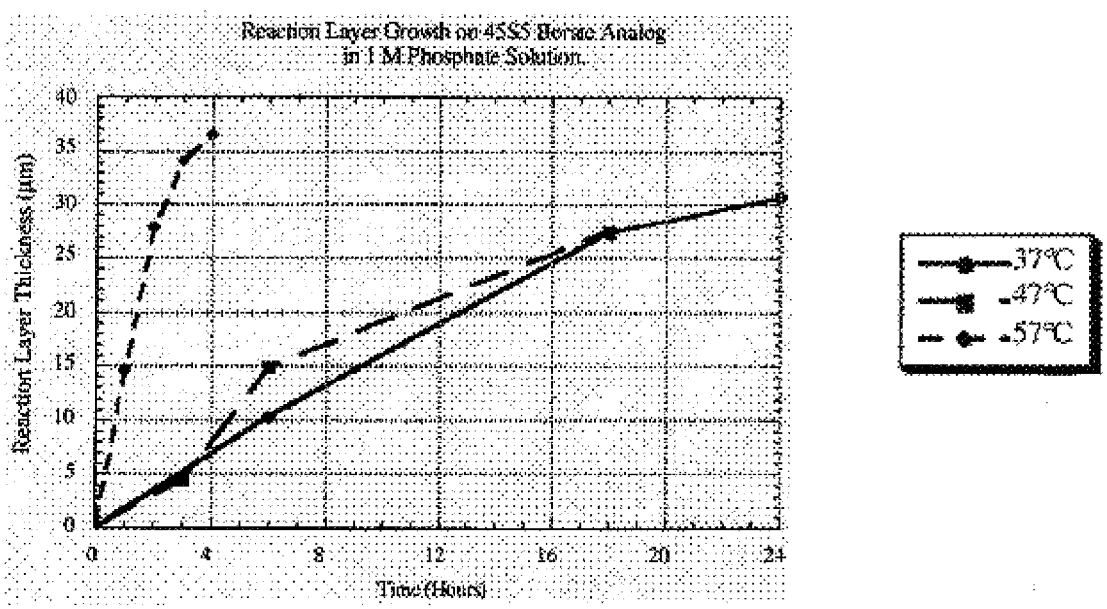
FIG. 1 shows a graph of reaction layer growth on 45B5-1 glass spheres in 1 M phosphate at different temperatures. These measurements are each the average of six spheres. Full reaction of the spheres occurred in 24, 18, and 4 hours at 37° C., 47° C., and 57° C., respectively.

Notwithstanding its inexhaustible embodiments, the invention is bioactive materials having the formula $xNa_2O \cdot yCaO \cdot zP_2O_5 \cdot qB_2O_3$ wherein x is from about 20% to about 35% by weight; y is from about 20% to about 35% by weight; z is from about 0% to about 10% by weight; and q is from about 30% to about 50% by weight. The bioactive materials can be ceramic, glass, glass-ceramic or a crystalline material. Many embodiments have a calcium phosphate surface layer upon the bioactive material and in others, the calcium phosphate layer is hydroxyapatite. The invention also forms a calcium phosphate layer when in contact with a physiological solution. In preferred embodiments, x is 22.9%, y is 22.9%, z is 5.6% and q is 48.6%. The invention can also take the form of particles that have a particle size range from about 1 μm to about 400 μm. Preferably, the range can be from about 40 μm to about 300 μm, or 60 μm to about 250 μm. More preferably the range can be from about 75 μm up to about 1 mm. The invention can be generally spherical, morselized, in coating form or in bulk. The invention can also be fibrous or foliaceous.

The invention is a particulate borate ceramic, the particles of the ceramic being at least a partial calcium phosphate layer thereupon.

This invention is also a process for providing a bioactive material comprising reacting a material having the formula $xNa_2O \cdot yCaO \cdot zP_2O_5 \cdot qB_2O_3$ with an aqueous solution comprising phosphate ions for a time sufficient to dispose CaP upon said material. The aqueous solutions used in the process can be $Na_2HPO_4$ or $K_2HPO_4$ with concentrations ranging from about 0.001 M to about 1 M. Preferably, the concentration is about 0.1 M or about 0.01 M. More preferably, the concentration is about 1 M. The phosphate solutions have an initial pH in the range of about 6 to about 10.

While providing faster methods for producing CaP on bioactive glasses, the invention can be conducted in a temperature range of about 30° C. to about 60° C. Preferably, the temperature range is about 35° C. to about 57° C. In another embodiment, the reaction takes place at a constant temperature of about 37° C. The process features a flexible reaction time from about 4 hours to about 2 weeks. The reaction time period can be about 5 days to about 14 days. A preferable time for the reaction is between about 4 hours to about 24 hours. In some embodiments the reaction time can be about 24 hours.

Certain embodiments of this invention provide bioactive ceramic materials comprising borate glass that possess a calcium phosphate layer. As used herein, borate glass refers to a material having a general composition of $Na_2O \cdot CaOP_2O_5 \cdot B_2O_3$ in some embodiments. 45B5-1 borate glass embodies certain aspects of this invention having the aforementioned composition. Typical embodiments of this invention are a ceramic material wherein $Na_2O$ is from about 20% to about 35%; CaO is from about 20% to about 35%; $P_2O_5$ is from about 0% to about 10%; and $B_{2O3}$ is from about 30% to about 50%. In more typical embodiments $Na_2O$ is from about 22% to about 30%, CaO is from about 22% to about 30%, $P_2O_5$ is from about 5% to about 6%, B2O3 is from about 35% to about 50%. The ranges disclosed herein include all combinations and subcombinations of ranges and specific percentages therein. In some preferred embodiments, there is about 22.9% $Na_2O$, about 22.9% CaO, about 5.6% $P_2O_5$ and about 48.6% B2O3. The percentages disclosed herein are meant to include the percent composition by weight. In other embodiments, it is foreseeable that the borate glass material can contain $Li_2O$ or $K_2O$.

As used herein, ceramic is considered all materials that are inorganic, nonmetallic solids. They can be metal oxides but many ceramics are also compounds of metallic elements and carbon, nitrogen, or sulfur. In atomic structure they are most often crystalline, although they also may contain a combination of glassy and crystalline phases. As used herein, glass is considered a non-crystalline inorganic solid material that can be transparent or translucent as well as hard and brittle. As used herein, glass-ceramic is considered a glass with crystalline components.

Typical embodiments of the invention are at least partially crystalline. 50% to 80% of the material may be crystalline. In other embodiments 30% to 50% may be crystalline and in more typical embodiments, less than 30% to less than 1% can by crystalline.

The invention provides a bioactive ceramic that is pre-reacted to give a calcium phosphate layer disposed upon the ceramic. This layer is a hydroxyapatite layer in some embodiments that may be preferred. The formation of the HAp layer on the borate glass of the present invention may be formed by reacting the glass with phosphate ions and is related to the pH change of the solutions that harbor the glass. The pH of solutions that interact with the borate ceramic display a general increase within the first two weeks. This is likely due to the high (25 mol %) alkali content of the material, which in turn increases solution alkalinity. It is generally observed that the final pH increases by 1.5 to 3 units in solutions of 0.1 M phosphate and lower. This high solution alkalinity promotes ion leaching from the material. Initially, sodium ions in the ceramic are replaced with hydrogen ions from solution to form hydroxyl groups. These hydroxyl groups react with the structural bonds between boron and oxygen, setting the boron ions free. As the ion exchange proceeds into the bulk of the ceramic, there is an increase in the surface area of the ceramic and dissolution occurs/proceeds from the surface inward. The pH of the solution eventually stabilizes since the ion concentration gradient (potential for exchange of ions between the solution and the glass) reaches steady state. Precipitation of a layer of calcium phosphate occurs from the ionic reaction between calcium and phosphate within the ceramic and in the solution. Over a number of days, the thickness of this precipitated surface layer increases.

General embodiments of the invention include a particulate borate ceramic, the particles being at least a partial calcium phosphate layer thereupon. The particles are generally found in a crushed state, 300 $\mu$m to 355 $\mu$m approximate size range. Embodiments can have a general diameter ranging from about 1 $\mu$m to about 1 mm, or 40 $\mu$m to about 400 $\mu$m. Preferably, the diameter range is about 60 $\mu$m to about 250 $\mu$m with 75 $\mu$m to about 150 $\mu$m being the most preferred. As used herein, the diameter range is measured by standard techniques including scanning electron microscopy (SEM) photos that had a calibrated length scale and using sieves of known openings.

The ceramic material can also come in the form of microspheres, morsels, fibers, flakes or even in bulk. It is appreciated that since the diameter range may vary, the shape of glass particles will also vary in their microspherical form. Therefore, their shape may be generally spherical. If the glass is not spheroidized but left in a crushed state, it is considered to be in morsel form. As used herein, the foliaceous shapes are considered those shapes having leaflike or flake-like structures. As used herein, the fibrous shapes are considered those structures having, consisting of or resembling fibers. As used herein, bulk forms are considered those that encompass a variety of shapes or forms in a large volume or mass. The material may also be used as a coating for other materials suitable for implantation within the body.

A subset of embodiments of this invention includes methods for making a bioactive glass material are provided. A material having the formula $Na_2O.CaO.P_2O_5.B_2O_3$ is reacted with an aqueous solution comprising phosphate ions for a time sufficient to form calcium phosphate upon said material. Solutions comprising phosphate ions used in many preferred embodiments of this invention include $Na_2HPO_4$ and $K_2HPO_4$. In other embodiments, acids containing phosphate ions, such as $H_3PO_4$, are reacted with the material.

In one embodiment, a HAp layer can be formed on the surface of 45B5-1 glass particles when reacted in aqueous phosphate ion solutions within a general range of 0.001 M to 1 M and all combinations and subcombinations of ranges and specific concentrations therein concentrations at 37° C. and starting pH of 7. The rate of formation is more apparent at 0.1 M and 1 M wherein formation occurs from 14 days to as few as 5 days, respectively. The rate of formation is slower for phosphate solutions of lower concentrations within a general range of 0.001 M to 0.01 M and all combinations and subcombinations of ranges and specific concentrations therein. However, the slower rates of the latter concentrations may be more favorable depending on the aims of the procedure for which the ceramics are being used.

The reaction can occur at constant temperatures generally within the 30° C. to 60° C. range and all combinations and subcombinations of ranges and specific temperatures therein. Formation of HAp on the material of the invention occurs within a range of 24 to 4 hours and all combinations and subcombinations of ranges and specific times therein when reacted in a 1 M aqueous phosphate solution at temperatures ranging from 37° C. to 57° C. (FIG. 1). At other concentrations, reaction time can vary from 4 hours to 2 weeks. At 0.1 M and 1 M, HAp can form at 37° C., the preferred temperature for the production of an implantable bioactive glass material, in 14 and 5 days, respectively. The time needed to produce an adequate layer of HAp varies with changes in the temperature of the reaction and/or the concentration of the phosphate solution. It is appreciated that there are circumstances when these variables can be altered for the specific purposes of the producer.

According to certain embodiments of this invention, the HAp on the ceramic enables the bioactive material to mimic the natural bone processes of osteoconduction, osteogenesis, and osteostimulation. The bioactive material of the many embodiments of this invention is rendered osteoconductive, osteostimulatory, or osteogenic when contacted with mammalian bodily fluids.

Certain embodiments of this invention demonstrate a lower melting temperature and a broader range of solubility when compared with 45S5 (melting temperatures 1300° C.–1400° C.). Absent also are any of the physiologic concerns that may be associated with having silica. Certain embodiments of this invention are impenetrable to X-rays and are therefore radiopaque, which has important medical implications, since it is often necessary or desirable to visualize the material once implanted (in vivo).

Figure 2:
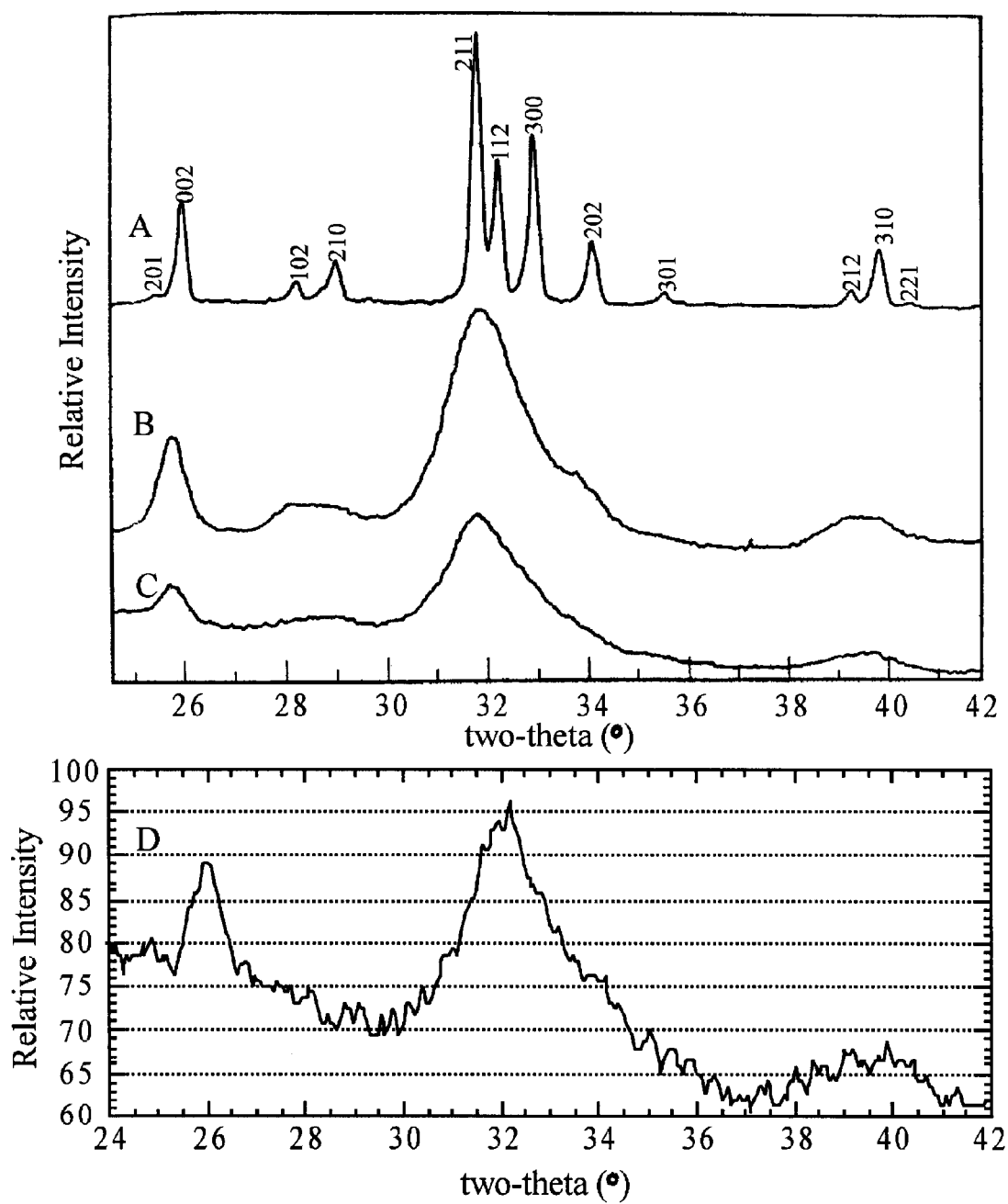
FIG. 2 shows the X-Ray diffraction (XRD) patterns of A) well crystallized HAp, B) synthetic HAp, C) the inorganic component of bone and D) 45B5-1 reacted with 1 M phosphate solution for 24 hours at 37° C.

Under in vivo conditions, the reaction of the bioactive particles occurs through the uniform continuous leaching of $Na^+$, $B^{+3}$ and $Ca^{30\ 2}$ from the ceramic. It has been determined that there is no shrinkage of the particles during the reaction of the material in $Na_2HPO_4$ solution or in simulated body fluids. Further, HAp formation on the surface of 45B5-1 has similar crystal shape, size and degree of crystallinity as natural bone when reacted with phosphate solutions. FIG. 2 shows the XRD pattern of the inorganic component of bone, synthetic HAp, well-crystallized HAp and 45B5-1 microspheres reacted with 1 M phosphate solution for one day at 37° C. The XRD pattern of 45B5-1 reacted with 1 M phosphate solution for 24 hours at 37° C. (FIG. 2D) is quite similar to the patterns for natural bone (FIG. 2C) and synthetic HAp (FIG. 2B), which indicates that the degree of crystallinity of the reacted 45B5-1 is close to natural bone. The shape and size of HAp crystals are also similar in the reacted 45B5-1 microspheres and living bone.

HAp formation is observed on XRD patterns of 45B5-1 after 1, 4, and 11 days in $Na_2HPO_4$ solution. IR spectra confirm the presence of HAp structures on the reacted ceramic. ICP analysis demonstrates the decrease in the amount of phosphorus and the total absence of calcium in the reacting solution after 80 days. The ICP results indicate that the phosphorus combines with the calcium from the glass to form HAp. SEM combined with EDS has established the presence of calcium and phosphate on the surface of the 45B5-1 spheres reacted in phosphate ion solutions ranging from 0.001 M to 1 M.

The invention is further unique in that it fosters the growth of CaP and is bioactive while being substantially free of silica. As used herein, substantially silica-free means less than 10% silica in some embodiments, fewer than 5% in others, and less than 2% in many. In more typical embodiments, the amount of silica is limited to that amount which will not interfere with the basic functions of this invention. In some embodiments that may be preferred, the invention contains only a trace of silica amounting to less than 0.25% by weight.

According to the ICP data, a uniform dissolution process of borate spheres that are silica-free occurs in aqueous phosphate solutions. In these phosphate solutions, a uniform dissolution releases all the sodium and phosphorous ions contained in the borate glass system without forming a borate gel. The absence of such a gel greatly lowers the interaction of the particles with the surrounding liquids, leading to a lower viscosity of the solid liquid suspension and a free flowing of the particles with body fluids. The calcium phosphate combines and freely precipitates on the surface of the glass spheres without the need for a silica gel nucleating agent, which was once believed necessary to foster bone growth on glass material.

The substantially silica-free borate glass materials embodied in this invention react faster when compared to the reaction kinetics of 45S5 glasses. The formation of a crystalline HAp layer on the 45S5 silicate glasses depends on several variables including the rate of ion exchange, hydroxylation of the glass surface and pH and ion concentration of the solution. XRD data shows a crystalline HAp pattern in 28 days for partially crystallized 45S5 glass spheres reacted in 0.1 M solution of starting pH of 7, whereas, it takes only 14 days for HAp to appear in the XRD pattern for silica-free borate glass reacted in the same solution. FIG. 3 shows the reaction products of 45S5c and 45B5-1 in phosphate solutions of varying molarity.

Unlike 45S5 glasses, the rate of formation of HAp on the surface of the bioactive borate ceramic of the present invention can occur within as few as 5 days. This is a result of the generally lower chemical durability of borate ceramic when compared to silicate glass, which in turn affects the rate of dissolution of the borate ceramic. Borate ceramics of the present invention tend to dissolve more uniformly/consistently since the dissolution rate of borate ceramic is controlled by bulk dissolution instead of the dissolution of a single species within the ceramic. Further, since no silica is present in the borate ceramic, no potentially problematic (biocompatibility-wise) silica layer is formed during the dissolution process. Additionally, borate ceramics can be formed at lower temperatures-lower melt/processing temperatures. In vivo, bone growth around bioactive borate ceramic particles is faster than the growth associated with silicate glass particles implanted under similar conditions.

EXAMPLES

Example—1

Glass Particle Preparation and Pre-Reaction Process

45B5-1 borate glass of composition of 48.6% $B_2O_3$, 22.9% CaO, 22.9% $Na_2O$, and 5.6% $P_2O_5$ Wt % was prepared using $H_3BO_3$, $CaCO_3$, $Na_2CO_3$, and $Na_2HPO_4$ (Fisher Scientific, St. Louis, Mo.). The raw materials were mixed and melted at 1100° C. in a platinum crucible for an hour. The melt was quenched between two room temperature stainless steel plates and then immediately annealed in an electrical furnace at 450° C. for three hours and cooled overnight. The borate glass was crushed and sieved to recover particles in the 300–355 micron size range, which were used for implantation.

Particles in the size range of 75–200 μm were spheroidized at 1000° C. The spheres were sieved to separate those in the 75–150 μm size range, which were used for experimentation. Other irregular particles in the size range of 45–75 μm were also used.

The spheres were produced in a vertical, electrically powered tube furnace. A hot zone, 127 cm in length, was sufficient to spheroidize the borate glass particles at 1000° C. The particles were dropped into the top of the furnace tube and the spheres collected at the bottom of the furnace tube in a glass jar. The tube was tightly sealed to prevent chimney effect, convection currents, in the tube. The annealing temperature of the glass was determined using differential thermal analysis (DTA). The spheres were annealed at 450° C. for an hour and cooled to room temperature.

The density of the glass particles and spheres was measured by a standard picnometer procedure using ethanol. The density measured for the 45B5-1 spheres and particles was around 2.16±0.2. The density indicated that the spheroidization process did not change the final density between glass particles and spheres.

DTA and Thermo-Gravimetric Analysis (TGA) were performed on 45B5-1 glass using a Netzsch STA 409 at a heating rate of 15° C. per minute in air. These techniques were used to determine the glass transition temperature and weight loss on heating from 22° C. to the melting temperature.

The onset of crystallization for the 45B5-1 glass occurred at 572° C.±5° C. and subsequent melting was found at 864° C.±2° C. (The glass transition temperature for the 45B5-1 glass was determined to be around 505° C.±5° C.) Little measurable weight loss of 0.03 wt % was observed over a temperature range of 1 00° C. to 1150° C.

To produce a layer of HAp on the surface of the particles, the 45B5-1 glass particles were reacted for 24 hours in a 1 M $Na_2HPO_4$ solution with a starting pH of 7 at 37° C. The phosphate solution was prepared by dissolving the appropriate amount of reagent grade $Na_2HPO_4$ (Fisher Scientific, St. Louis, Mo.) in distilled water acidified with 1.5 M HCl. After complete dissolution of the $Na_2HPO_4$, the pH was adjusted to 7 with 1.5 M tris (hydroxymethyl) aminomethane.

Example—2

Phosphate Solutions $K_2HPO_4$ Solutions

Partially crystallized 45S5 glass spheres, hereinafter referred to as 45S5c, and 45B5-1 glass spheres were reacted in $K_2HPO_4$ solutions at a constant temperature of 37° C. The 45S5c glass was reacted in solutions of 1, 0.1, 0.01, and 0.001 M $K_2HPO_4$ at a starting pH of 7, 8 and, 9.5. The 45B5-1 glass was reacted in solutions of 1, 0.1, 0.01, and 0.001 M $K_2HPO_4$ at starting pH of 7.

The phosphate solutions were prepared in glass beakers by dissolving the appropriate amounts of $K_2HPO_4$ reagent grade in distilled water. The pH was monitored and adjusted with HCl to obtain the desired starting pH value. The HCl used was diluted with distilled water to a concentration of about 14%. The phosphate solutions were stored at a constant temperature of 37° C.

XRD Investigation of Hydroxyapatite Formation

Figure 4A:
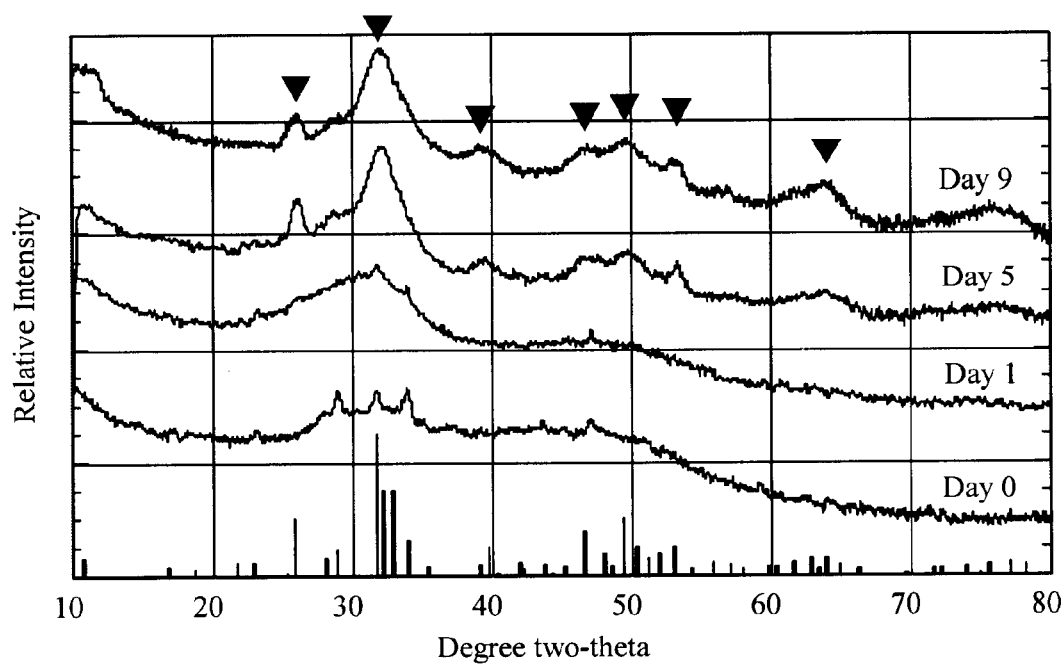
FIG. 4 shows the XRD patterns of 45B5-1 glass spheres 75 to 150 μm in diameter reacted with 1 M (A) and 0.1 M (B) solution at 37° C., initial pH=7. The main HAp peaks are marked with arrows and indicated by the lines at the bottom of each figure.

1 M $K_2HPO_4$ solutions. The XRD pattern of FIG. 4A shows that the formation of hydroxyapatite upon 45B5-1 glass spheres reacted in 1 M $K_2HPO_4$ solution occurs in as few as 5 days at 37° C. The main XRD peaks of the pattern obtained after 5 days of reaction matches closely the 2Θ locations and relative intensities of HAp as given by the PDF card 9–432.

Figure 4B:
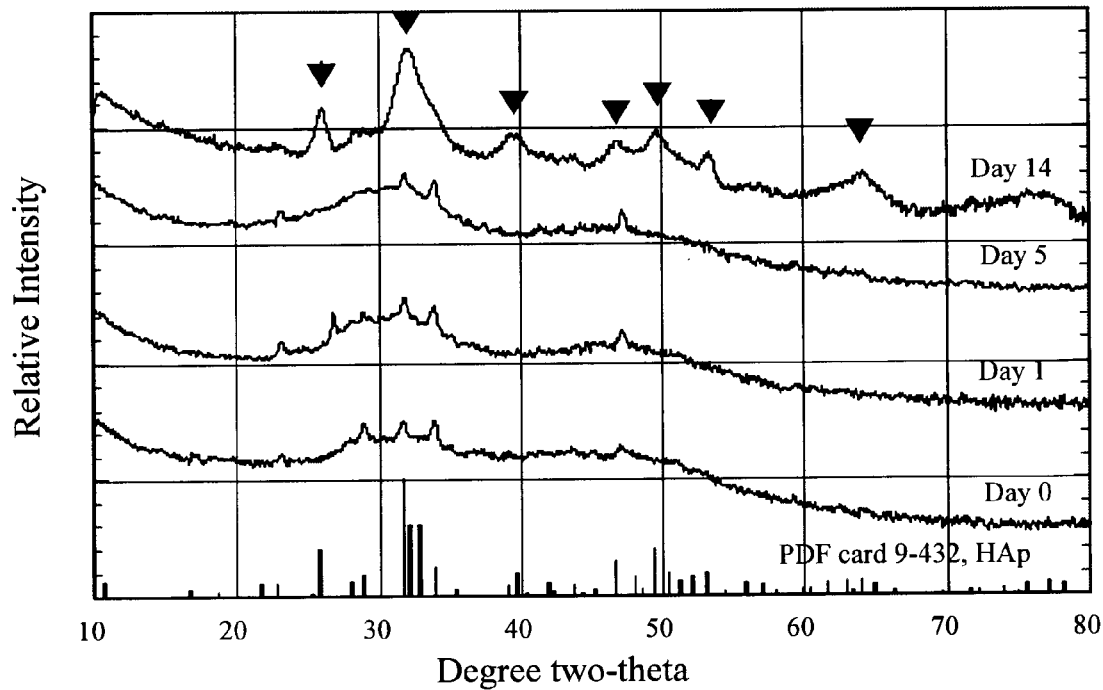

0.1 M $K_2HPO_4$ solutions. The XRD pattern of FIG. 4B shows that the formation of HAp occurs in as few as 14 days for the 45B5-1 glass reacted in 0.1 M $K_2HPO_4$ solution at 37° C. No further change in the XRD pattern is observed with further reaction of the spheres up to 35 days in the 0.1 M solution. The XRD pattern shows strong diffraction peaks for hydroxyapatite for the borate glass spheres reacted in the 0.1 M $K_2HPO_4$ solution.

Figure 5A:
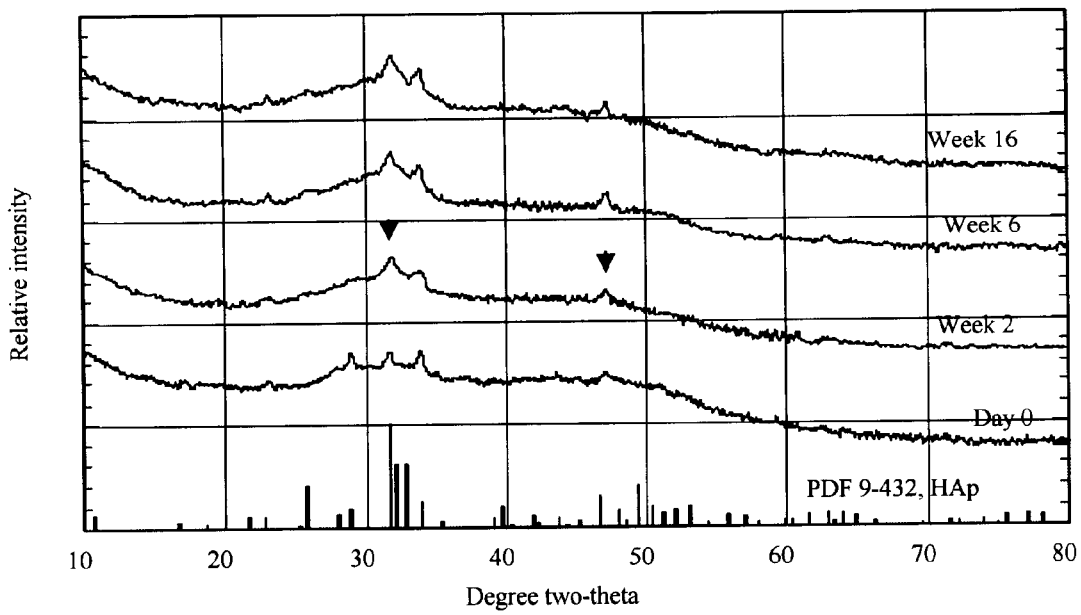
FIG. 5 shows the XRD patterns of 45B5-1 glass spheres reacted in 0.01 M (A) and 0.001 M (B) solution at 37° C., initial pH=7. Only a weak HAp XRD pattern appears after 112 days of reaction (16 weeks).
Figure 5B:
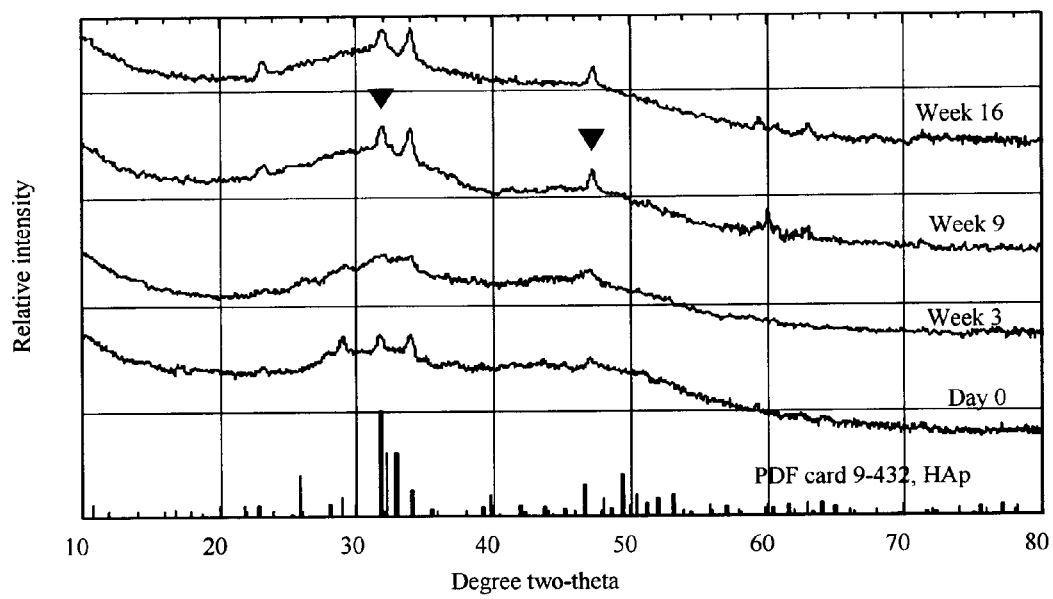

0.01 M and 0.001 M $K_2HPO_4$ solutions. The XRD patterns of 45B5-1 glass spheres reacted with 0.01 M and 0.001 M phosphate solutions show the formation of poorly crystalline HAp. FIGS. 5A and 5B show the XRD spectra for 45B5-1 glass spheres reacted in 0.01 M and 0.001 M phosphate solutions at a starting pH of 7 at 37° C., respectively. The XRD pattern of 45B5-1 glass reacted in the 0.01 M solution after 2 weeks shows only a low intensity, diffuse split peak indicated by arrows around 32° to 34° (2θ). The XRD pattern seemed unchanged between 2 to 16 weeks for the glass spheres reacted in the 0.01 M phosphate solution. The XRD pattern of the 45B5-1 glass reacted for up to 9 weeks in the 0.001 M solution slowly changes towards the low intensity and diffuse split peak mentioned above and indicated by arrows in FIG. 5B. After 9 weeks, the XRD pattern remains unchanged with further reaction up to 16 weeks.

SEM Investigation

Figure 6:
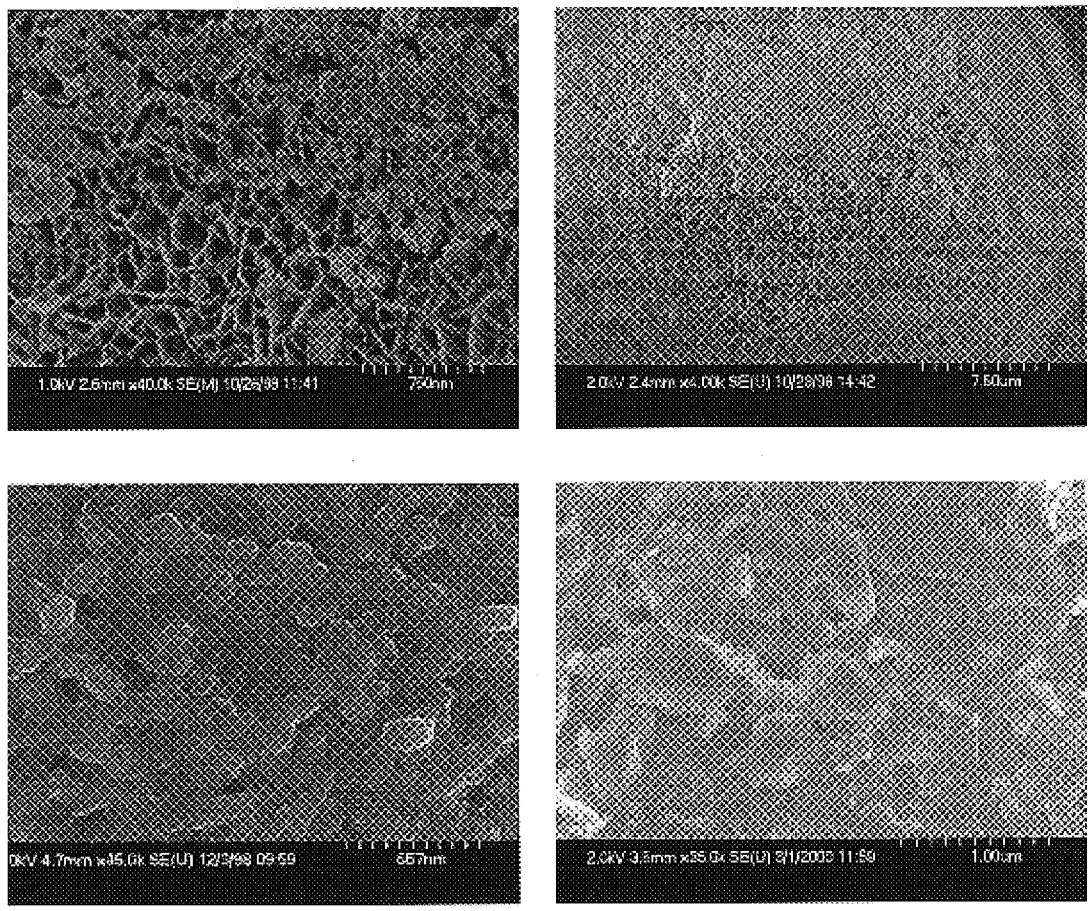
FIG. 6 depicts the appearance of hydroxyapatite crystals on the surface of 45B5-1 glass spheres reacted for 1, 4, 11, and 26 days in a 1 M $K_2HPO_4$ solution at 37° C. of starting pH of 7 (respectively A, B, C and D).

The SEM observations of samples of borate spheres reacted in 1 M $K_2HPO_4$ solution for 1, 4, 11 and 26 days show the presence of a HAp microstructure (FIG. 6). The external surface of a reacted sphere is covered with a platelike structure at day 1 (FIG. 6A). These small plates, arranged perpendicular to the surface of the glass, homogeneously cover the entire surface of the reacted spheres at days 4 and 11 (FIGS. 6B and 6C). At day 26 (FIG. 6D), the plates have completely covered the surface of the spheres obstructing the little porosity that remained at day 11. The outer layer covering the glass spheres seems to form a impermeable layer that might slow down further bulk dissolution reaction of the glass with the solution, but according to the IR spectra and XRD diffraction pattern at 26 days of reaction, 45B5-1 glass spheres have already formed a fully crystalline HAp.

The reaction layer formed at days 1 and 4 with platelike, fine structures is more or less ordered and forms a porous structure. EDS revealed the presence of calcium and phosphorus with a Ca/P ratio of 1.42±0.5 in contrast with the HAp stochiometric Ca/P ratio of 1.67. (The platelike particles about 50 microns across on the surface of 45B5-1 glass spheres reacted in 1 M solution do not seem to increase in size between 1 and 26 days.) The stability in the size of the particles between 1 and 26 days indicates that the formation of calcium phosphate particles on borate glass spheres reacted in a 1 M $K_2HPO_4$ solution is a uniform and rapid process that occurs in one day. The same platelike microstructure was observed on 45B5-1 borate glass spheres reacted for one day in a 0.1 M $K_2HPO_4$ solution.

Borate glass spheres reacted in the 0.01 M $K_2HPO_4$ solution for 16 weeks (FIG. 7) also exhibit a platelike, porous microstructure. The platelike structure observed on the sample reacted in 1 M and 0.1 M solution is still present on one of the spheres but a somewhat different morphology is generally observed on the other spheres. Approximately 5 microns underneath the thin layer of plates, a sponge like disorganized structure made of smaller plates and a porous network is observed.

$Na_2HPO_4$ Solutions

A 1 M phosphate solution was prepared by dissolving an appropriate amount of sodium phosphate ($Na_2HPO_4$) in de-ionized water along with 1.5 M HCl. After the sodium phosphate dissolved, 1.5 M tris (hydroxymethyl) aminomethane was added to raise the solution pH to 7.0.

The reactions of annealed 45SB1 glass microspheres with 1 M phosphate at 37° C. were observed by optical microscopy until the microspheres had fully reacted to leave a microsphere with no unreacted glass core. To produce larger amounts of reacted microspheres for characterization, annealed 45SB1 microspheres were placed in the 1 M phosphate solution at a glass to solution ratio of 1 mg/ml, at a temperature of 37° C. After 1, 4, 11, and 28 days at 37° C., microspheres were removed from the solution, dehydrated in a graded series of ethanol (80, 90, and 100%), and analyzed by SEM-EDS and XRD. The external surface of microspheres reacted for each time was examined by SEM, and the cross-section of microspheres from the one-day sample was examined by SEM-EDS. The microspheres were not heat treated after reacting with the phosphate solution.

Annealed 45S5 glass microspheres were reacted with 0.25 M phosphate solution under the conditions described above. After 4, 14, and 28 days, microspheres were removed from the solution, and the external surfaces were examined by SEM. The reacted microspheres were also crushed with a mortar and pestle and analyzed by XRD. Only the external surface of microspheres reacted for each time was examined by SEM.

Figure 8:
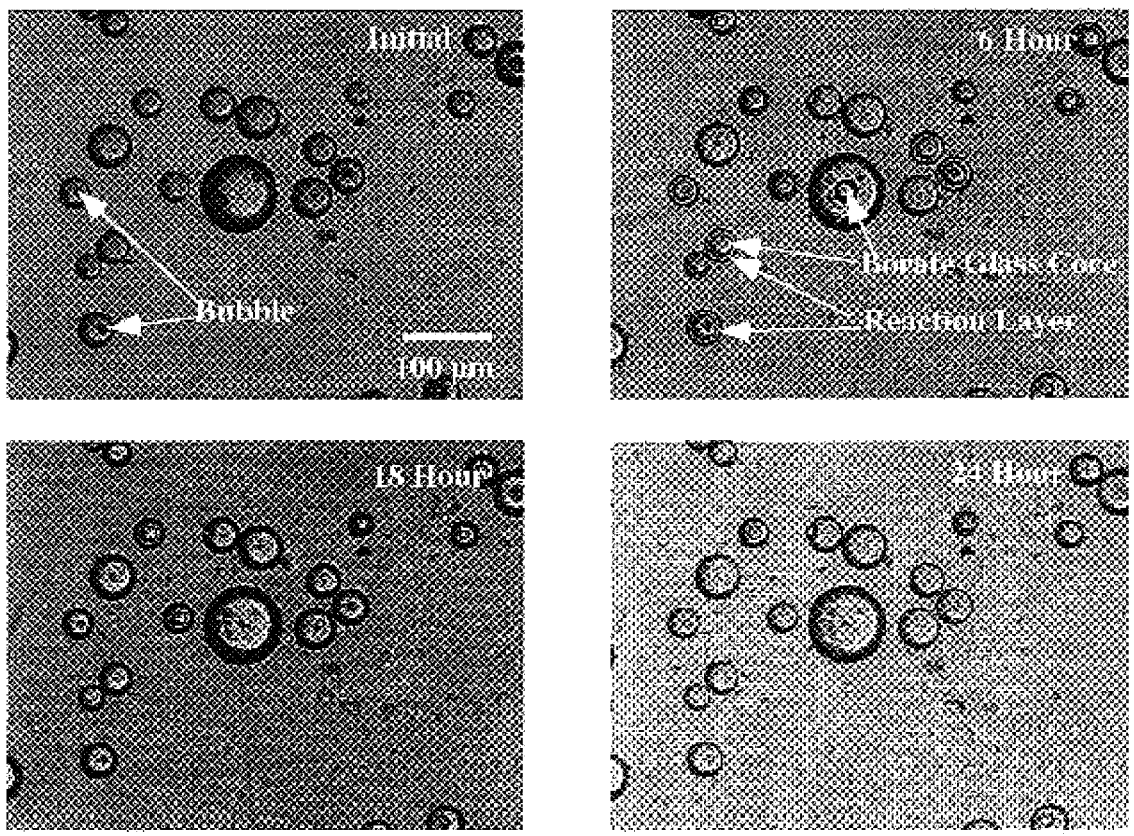
FIG. 8 shows 45B5-1 glass microspheres immersed in 1 M $Na_2HPO_4$ solution at 37° C. at initial, 6 hour, 18 hour and 24 hour times. The bubbles shown in the initial frame are a result of flame spheroidization.
Figure 9:
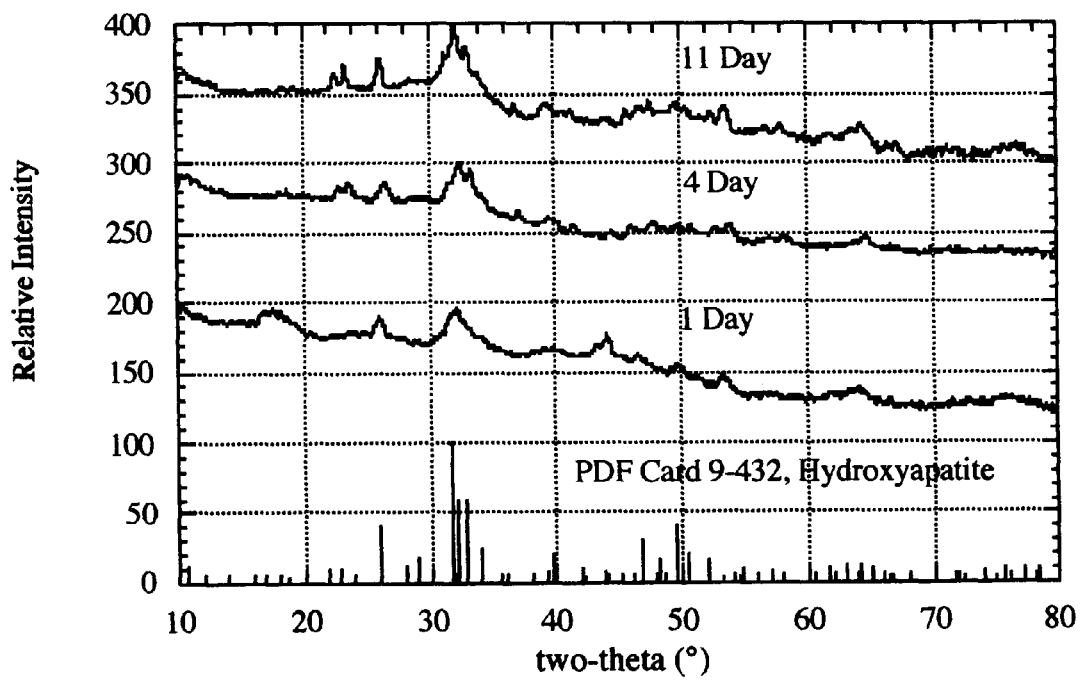
FIG. 9 depicts XRD patterns of 45B5-1 reacted with 1 M phosphate for 1, 4, and 1 1 days, and the documented XRD pattern for Hap.

1 M and 0.25 M $Na_2HPO_4$ solutions. Microspheres of 45B5-1 glass immersed in the 1 M phosphate solution at 37° C. fully reacted in 24 hours, as shown in FIG. 8. The reaction product was a homogenous gel. FIG. 9 shows XRD patterns for annealed 45B5-1 microspheres that have been reacted with 1 M phosphate solution for 1, 4, and 11 days at 37° C., and the documented XRD pattern for HAp. These XRD patterns indicate the HAp is present along with residual amorphous material. Although it has been documented, that the crystallization of HAp on a glass surface is dependent on the presence of a silica gel layer, which serves as heterogeneous nucleation sites for HAp, these data suggest otherwise (since 45B5-1 glass contains no silica).

SEM Investigation

SEM-EDS indicated that the 45S5 microspheres that had reacted for one day with 1 M phosphate solution at 37° C. had a Ca:P ratio of 1.2, which is calcium deficient with respect to HAp (Ca:P=1.5 to 1.67). These results are consistent with the XRD pattern, which showed the presence of some amorphous material, such as amorphous calcium phosphate (ACP), which usually has a Ca:P ratio ranging from 1.2 to 1.5. The cross-sections of the 45B5-1 glass microspheres reacted with 1 M phosphate for 24 hrs at 37° C. is shown in FIG. 10. Several of the microspheres shown in FIG. 10 have a dark spot in the center, which may contain a larger volume fraction PMMA than the rest of the microsphere. The dark spot indicates that the reacted microspheres may have a lower density at the center than at the edges.

Figure 11:
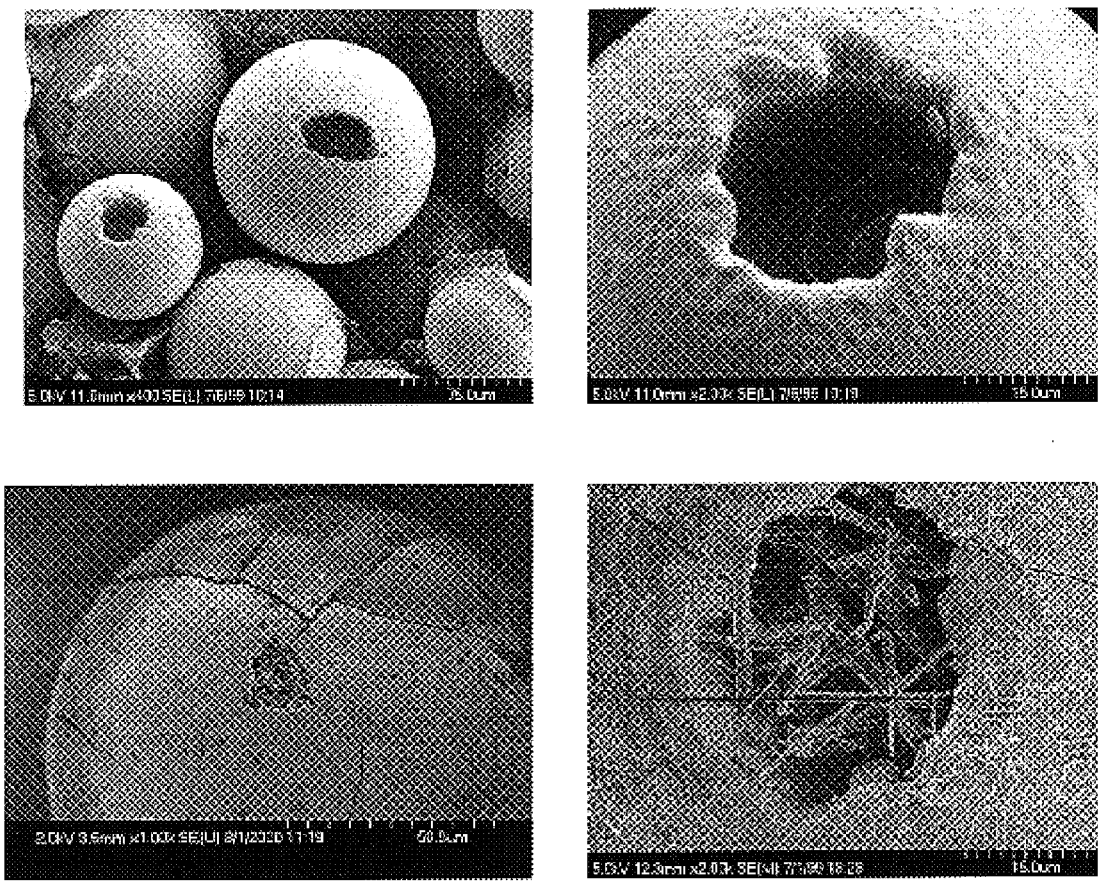
FIG. 11 depicts surface apertures of 45B5-1 (A and B) glass spheres reacted in 1 M $K_2HPO_4$ solutions for 5 days).

The external surfaces of 45B5-1 microspheres which have reacted with 1 M phosphate solution for 1, 4, 11 and 28 days are shown in FIG. 11. After reacting for one day in 1 M phosphate solution, the surface of 45B5-1 is covered with needle-like and plate like crystals of HAp, with a size ranging from 5 by 100 nm to 10 by 200 nm. This crystal size and shape has also been reported as the structure of HAp precipitated from a solution and the apatitic component of natural bone. The initial structure of the crystals was still visible after 4 days, but the crystals had grown outward from the surface to become more plate-like. The crystals also grew to approximately twice the length that they were after 1 day of reaction with 1 M phosphate solution. After 11 days in 1 M phosphate solution, both needle-like and plate-like crystals appeared to be present. Only plate-like particles are visible after 28 days of reaction. Both needle-like and plate-like morphologies have been reported in the structure of the apatitic component of bone. However, the crystals formed by reactions longer than one day were larger than those present in natural bone, which are typically 40 by 20 nm or smaller.

When 45S5 glass microspheres were reacted with the 0.25 M phosphate solution at 37° C., for 14 and 28 days, XRD showed that HAp was present. The reaction layer on the particles was only ~10 $\mu$m thick. A glassy core appeared in each microsphere, which accounts for the high background in the XRD pattern. The surface of 45S5 glass microspheres reacted with 0.25 M phosphate solution consisted of needle-like HAp crystals. Microspheres reacted for 28 days, retained the needle-like structure seen after 14 days of reaction and the XRD pattern did not change significantly. This retention of structure differed from the reactions of 45B5-1 glass with 1 M phosphate solution, where the morphology of the HAp crystals changed from needle-like to plate-like and the crystals grew.

Example—3

In Vivo Use

Prior to surgery, the glass powder was made as described in Example 1, and then stored in glass vials tightly covered with aluminum foil and heat sterilized at 450° C. in an electrical furnace for 3 hours. To promote the formation of a calcium phosphate rich layer on the surface of the bioactive glass particles and to increase the formation rate of the new bone, the borate glass particles were pre-reacted for 24 hours in 1 M $Na_2HPO_4$ solution. The reacted surface layer that formed in 24 hours on the glass particles consisted of an amorphous calcium phosphate rich layer, with an average thickness, as determined by SEM, of 60 $\mu$m±20 and was identified as composed of needle-like or small (300–600 nm) plates standing nearly perpendicular to the surface of the glass. This platelike structure was very similar to the structure observed on particles reacted under the same conditions in 1 M $K_2HPO_4$ solutions.

45S5 silicate glass particles were obtained from Mo-Sci Corp. (Rolla, Mo.) and used in their as received state. After receipt, they were stored in glass vials tightly covered with aluminum foil and heat sterilized at 500° C. in an electrical furnace for 3 hours. Particles in the size range of 300–355 micron were used for implantation. The particles of 45S5 glass and particles of 45B5-1 glass were implanted in the upper part of the tibia of 12 mature male rats. The rats were anesthetized with a xylazine-ketamine mixture injected intraperitoneally. A 0.5 mm diameter dental drill, was used under phosphate buffered solution (PBS) irrigation, to make two holes in each tibia that penetrated into the bone marrow region. The resulting holes in the tibia of the rats were between 0.6 to 1.2 mm in diameter.

The glass particles were loosely packed in a glass capillary tube 0.5 mm in diameter. Pressure applied on a plunger introduced in the capillary tube released the glass particles in the hole. Contact of the capillary tube with body fluids had to be avoided since the fluids would instantly wet the glass particles and prevent them from sliding out of the capillary tube hole.

Once the particles were placed in the tibia hole, the wound was closed externally by staple-like metallic clips. All the rats survived the surgery, appeared healthy and showed no sign of post-surgery infection. The rats were sacrificed at 15, 30, 45 and 60 days after implantation. The tibiae recovered from the rats were fixed in 4% formaldehyde, dehydrated in serial ethanol concentrations and embedded in polymethylmethacrylate (PMMA). At the site of each hole, the tibia was sectioned with a diamond saw, polished with 1 $\mu$m diamond paste and coated with a gold palladium film for examination in a Hitachi S-570 (Hitachi, Japan) or Jeol T330 A (Jeol, Japan) SEM.

Backscattered electron (BSE) imaging was used to determine the degree of bone growth for each implantation periods. In back-scattered mode, the light colored regions correspond to elements with a higher atomic number while the darker regions contain elements of lower atomic numbers. New bone generally had a medium to light gray color and un-mineralized calcium phosphate was a whiter, light gray color. The unreacted glassy core of the particles was a dark gray color.

Reaction of the Borate Glass Particles In Vivo

The 45B5-1 glass particles had a glassy, dark core in the center of the particles surrounded by a continuous layer. This white layer was identified by EDS to be calcium phosphate rich with a calcium to phosphorus ratio of 1.45±0.1 (stochiometric HAp has a Ca/P ratio of 1.67). XRD analysis revealed that the crystalline calcium phosphate rich layer, initially too thin to give any diffraction pattern, became detectable in as little as 11 days. Black lines drawn on some of the figures denote the edges of the initial hole in the tibia.

Figure 12:
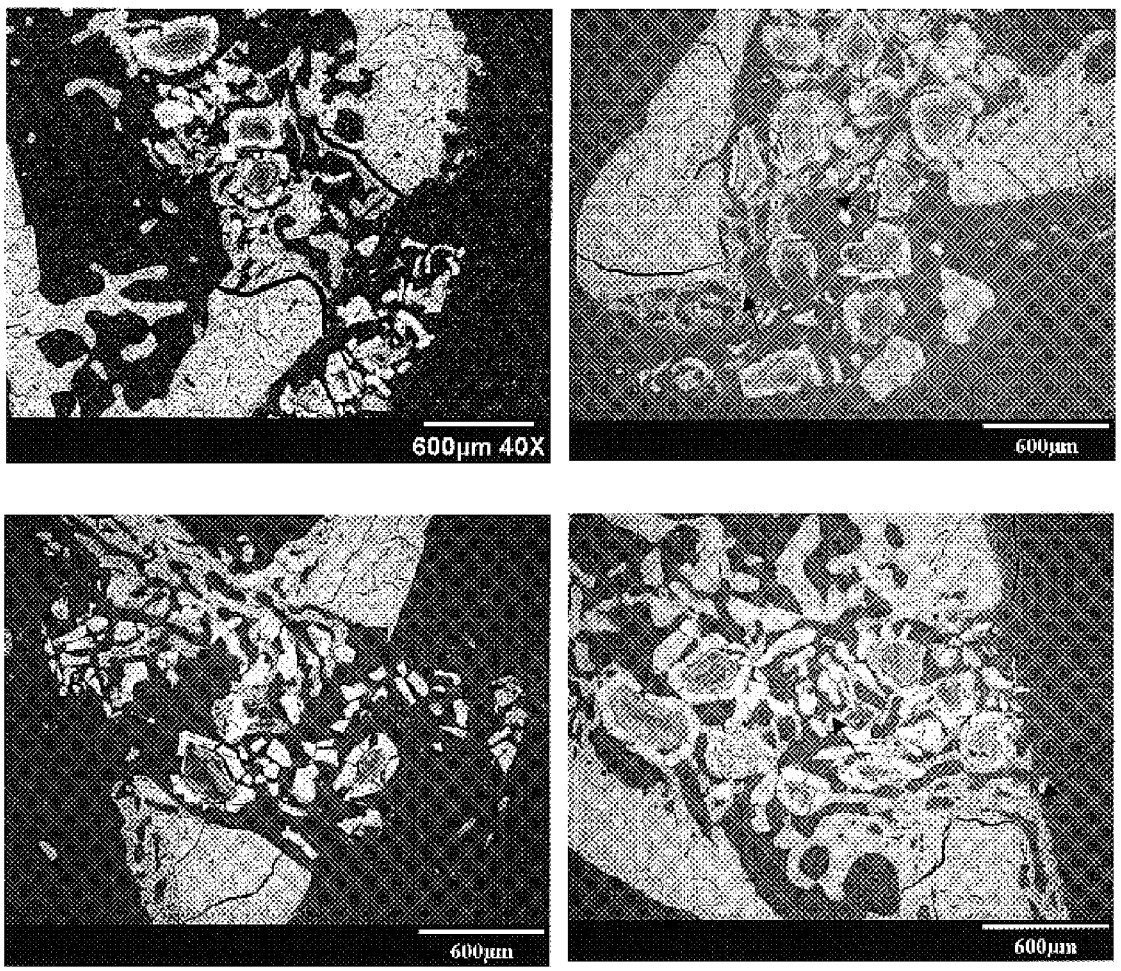
FIG. 12 depicts a cross section of a rat tibia containing 45B5-1 glass particles implanted for 15 days in vivo. The black lines denote the edges of the initial hole. New bone (shown by black arrows) has formed on the edge of the holes and around the particles, but the holes are still open.

Reaction after 15 days. New bone formation (medium gray in color) was observed as early as 15 days around some particles (FIG. 12). New bone indicated by the arrows was also visible at the edge of the hole, even though the original hole was not completely filled at 15 days. The average thickness of the reacted surface layer on the 45B5-1 glass particles slightly increased from 60 $\mu$m±20 to 80 $\mu$m±20. The particles of 45S5 glass and 45B5-1 glass seemed to stay in place at the edge of the cavity. The rapid formation of bone indicates that the pre-reacted surface is a suitable environment for bone bonding or growth.

Figure 13:
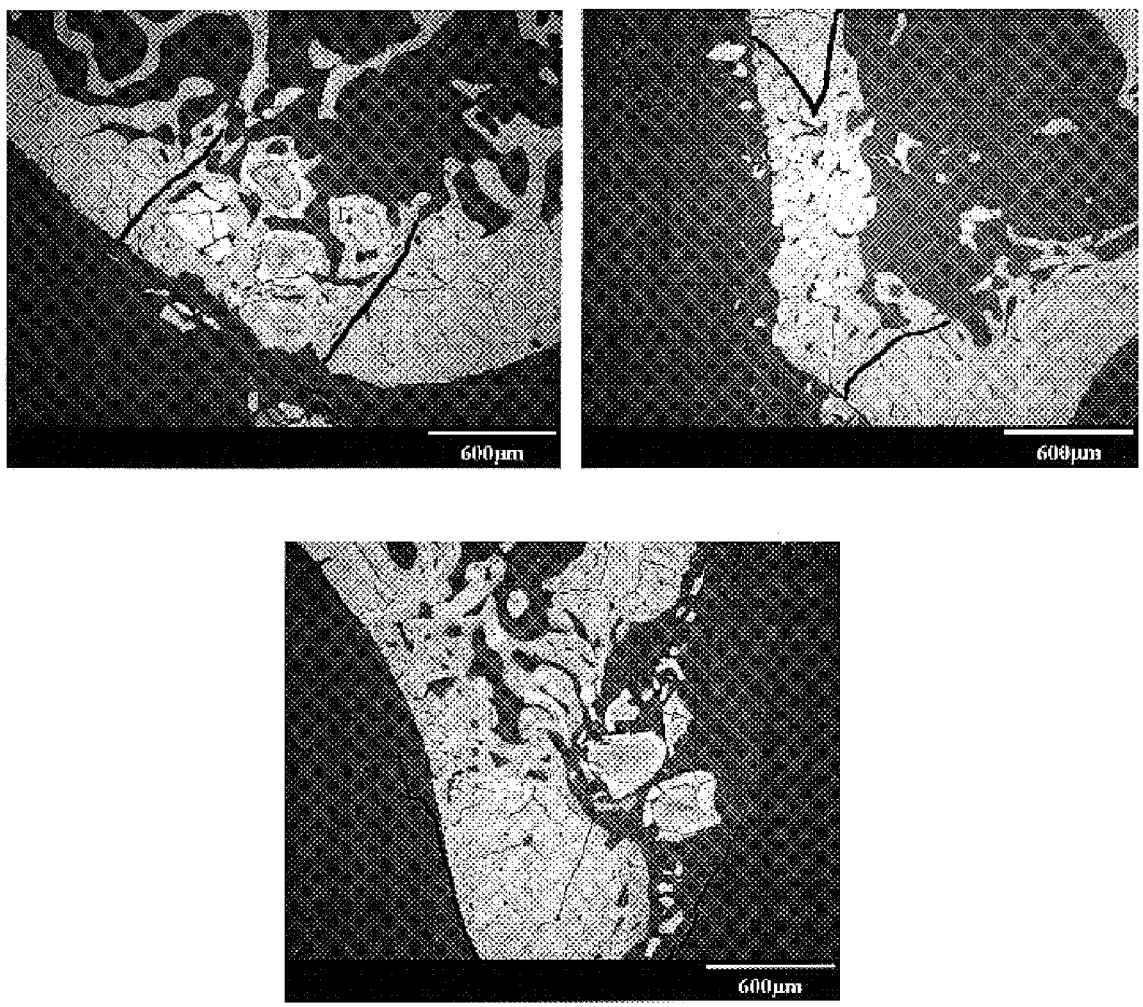
FIG. 13 depicts a cross section of a rat tibia containing 45B5-1 glass particles after 30 days in vivo. The particles of 45B5-1 are surrounded by new bone and the original holes are sealed.

Reaction after 30 days. After 30 days in vivo, both the 45B5-1 (FIG. 13) and the 45S5 glass particles were largely in contact with new bone. A layer of porous new bone closed the hole in all cases. The reacted layer did not seem to increase in thickness around the 45S5 glass (approx. 30 to 50 microns thick after 30 days in the rat). This surface layer was easily visible around the dark core of the 45S5 particles.

The unreacted core of the silica-free borate glass particles surrounded with new bone did not shrink. The thickness of the surface layer surrounding the 45B5-1 glass particles was still approximately 80 $\mu$m±20 after 30 days, but the lighter surface layer on the borate particles had cracked and in some cases separated from the medium gray core.

In general, the new bone that had formed around the pre-reacted borate particles after 30 days appeared denser (with smaller pores) and thicker than the bone associated with the 45S5 glass particles. However, it should be recalled that even though the borate glass particles were pre-reacted before implantation, the calcium phosphate layer grown in vitro was only about 60 microns in thickness.

Reaction after 60 days. After 60 days in the rat, the holes were completely closed and it was often difficult to distinguish between the old and new bone. It was difficult to distinguish the residual core of the 45B5-1 glass particles, which were embedded in the new bone. The entire borate particles (light gray) were surrounded by dense new bone. However, a dark core was still visible in many of the 45B5-1 particles trapped in the marrow cavity.

Unlike the borate particles, the 45S5 glass particles surrounded by new bone still contained a visible dark core most likely because they were not fully reacted after 60 days in vivo.

The foregoing specification is meant to illustrate the invention, and not limit it in any way. Those skilled in the art will recognize that modifications of little or great degree can be made which are within the spirit and scope of the many embodiments of this invention as defined in the appended claims.

What is claimed is:

1. A bioactive material having the formula $$xNa_2O \cdot yCaO \cdot zP_2O_5 \cdot qB_2O_3$$

wherein x is from about 20% to about 35%;

y is from about 20% to about 35%;

z is from about 0% to about 10%; and q is from about 30% to about 50%.

2. The bioactive material of claim 1 wherein the material is ceramic.

3. The bioactive material of claim 1 wherein the material is glass.

4. The bioactive material of claim 1 wherein the material is glass-ceramic.

5. The bioactive material of claim 1 wherein the material is at least partially crystalline.

6. The bioactive material of claim 1 having a calcium phosphate surface layer thereupon.

7. The bioactive material of claim 6 wherein the calcium phosphate layer is hydroxyapatite.

8. The bioactive material of claim 1 which forms a calcium phosphate layer when in contact with a physiological solution.

9. The bioactive material of claim 1 wherein x is from about 22% to about 30%, y is from about 22% to about 30%, z is from about 5% to about 6%, q is from about 35% to about 50%.

10. The bioactive material of claim 1 wherein x is about 22.9%, y is about 22.9%, z is about 5.6% and q is about 48.6%.

11. The bioactive material of claim 1 wherein the glass is comprised of particles.

12. A particulate borate ceramic, the particles of the ceramic being at least a partial calcium phosphate layer thereupon.

13. A process for providing a bioactive material comprising reacting a material having the formula $xNa_2O \cdot yCaO \cdot zP_2O_5 \cdot qB_2O_3$:

wherein x is from about 20% to about 35%;

y is from about 20% to about 35%;

z is from about 0% to about 10%; and q is from about 30% to about 50%;

with an aqueous solution comprising phosphate ions for a time sufficient to form calcium phosphate upon said material.

14. The process of claim 13 wherein the material is ceramic.

15. The process of claim 13 wherein the material is glass.

16. The process of claim 13 wherein the material is glass-ceramic.

17. The process of claim 13 wherein x is from about 22% to about 30%, y is from about 22% to about 30%, z is from about 5% to about 6%, q is from about 35% to about 50%.

18. The process of claim 13 wherein x is about 22.9%, y is about 22.9%, z is about 5.6% and q is about 48.6%.

19. The process of claim 13 wherein the aqueous solution is $Na_2HPO_4$.

20. The process of claim 13 wherein the aqueous solution is $K_2HPO_4$.

21. The process of claim 13 wherein the phosphate solution has a concentration of about 0.001 M to about 1 M.

22. The process of claim 21 wherein the phosphate solution has a concentration of about 0.01 M to about 0.25 M.

23. The process of claim 13 wherein the initial pH is in the range of about 6 to about 10.

24. The process of claim 23 wherein the initial pH is about 7.

25. The process of claim 13 wherein the temperature is in the range of about 30° C. to about 60° C.

26. The process of claim 25 wherein the temperature is about 35° C. to about 57° C.

27. The process of claim 13 wherein the temperature is about 37° C.

28. The process of claim 13 wherein said time is from about 4 hours to about 14 days.

29. The process of claim 28 wherein the time is from about 5 days to about 14 days.

30. The process of claim 13 wherein the time is about 24 hours.

31. The process of claim 13 wherein the material is comprised of particles.

32. The process of claim 31 wherein the glass has a particle size range from about 1 μm to about 400 μm.

33. The process of claim 32 wherein the glass has a particle size range from about 40 μm to about 300 μm.

34. The process of claim 33 wherein the glass has a particle size range from about 60 μm to about 250 μm.

35. The process of claim 13 wherein the glass has a particle size range from about 75 μm up to about 1 mm.

36. The process of claim 13 wherein the material is generally spherical.

37. The process of claim 13 wherein the material is in morsel form.

38. The process of claim 13 wherein the material is in bulk form.

39. The process of claim 13 wherein the material is fibrous.

40. The process of claim 13 wherein the material is foliaceous.

* * * * *

UNITED STATES PATENT AND TRADEMARK OFFICE
CERTIFICATE OF CORRECTION

PATENT NO. : 6,709,744 B1
DATED : March 23, 2004
INVENTOR(S) : Day et al.

Page 1 of 1

It is certified that error appears in the above-identified patent and that said Letters Patent is hereby corrected as shown below:

Column 2,
Line 4, delete "Sio$_2$" and insert therefor -- SiO$_2$ --.

Column 3,
Line 17, delete "1 1" and insert therefor -- 11 --.

Column 4,
Lines 30 and 34, delete "B2O3" and insert therefor -- B$_2$O$_3$ --.

Column 6,
Line 35, delete "Ca$^{30\ 2}$" and insert therefor -- Ca$^{+2}$ --.

Signed and Sealed this

Nineteenth Day of October, 2004

JON W. DUDAS
*Director of the United States Patent and Trademark Office*